April 22, 1958 R. A. JACOBS, JR 2,831,917
COLOR PHASE ALTERNATION SYSTEM
Filed Oct. 30, 1953
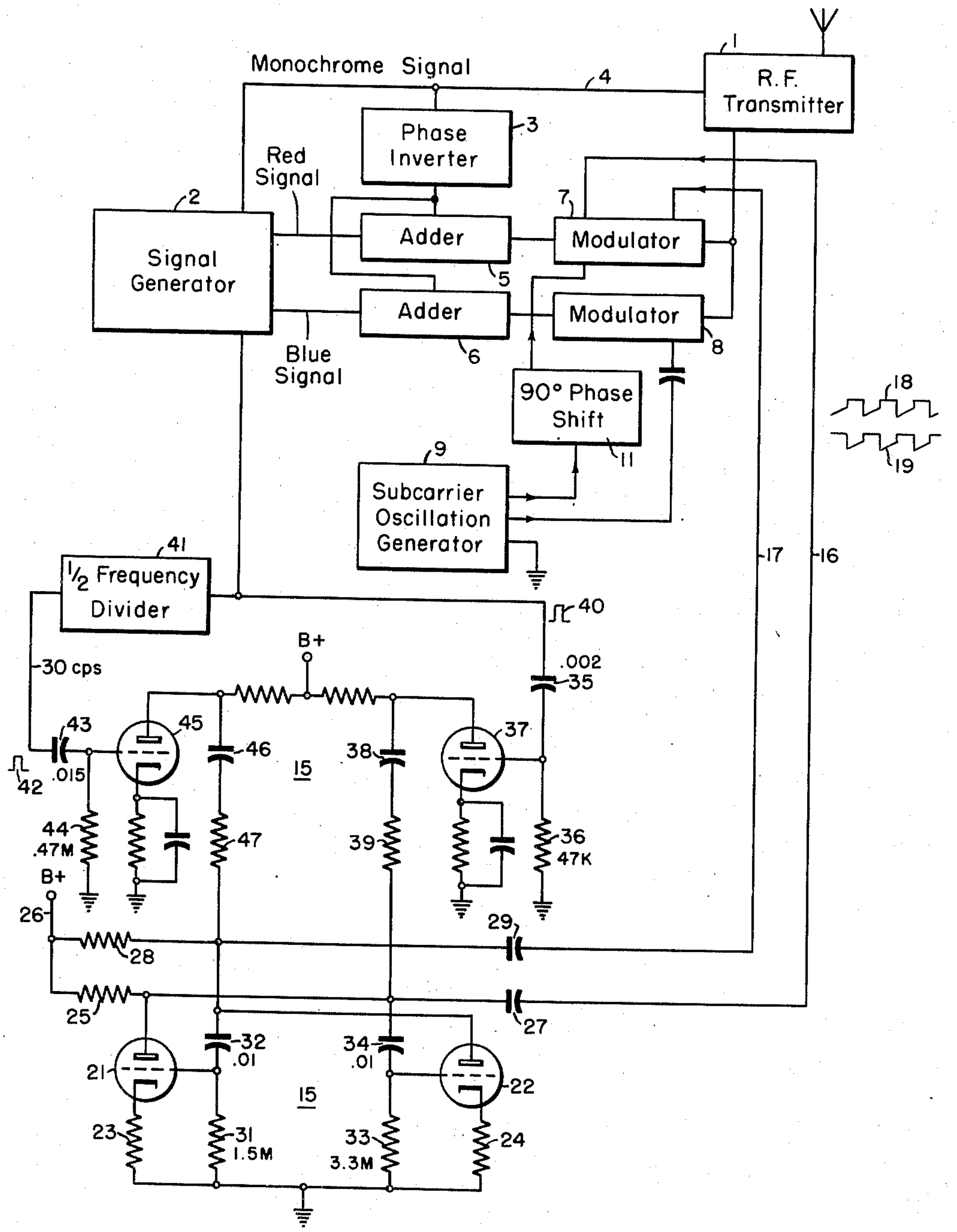
WITNESSES:
Robert C. Baird
Leon M. Garman
INVENTOR
Rudolph A. Jacobs, Jr.
BY
F. E. Browder
ATTORNEY 2,831,917
Patented Apr. 22, 1958

2,831,917

COLOR PHASE ALTERNATION SYSTEM

Rudolph A. Jacobs, Jr., Metuchen, N. J., assignor to Westinghouse Electric Corporation, East Pittsburgh, Pa., a corporation of Pennsylvania Application October 30, 1953, Serial No. 389,426

7 Claims. (Cl. 178—5.4)

My invention relates to multivibrators and in particular relates to an arrangement for insuring proper phasing of a multivibrator at a submultiple of the frequency of periodic voltage pulses which are impressed on it. One such use is to control the switching of a color channel in a color television transmitter.

The National Television Systems Committee (hereafter called NTSC) has advocated a color television system in which color information in pictures is transmitted on a subcarrier of fixed frequency for each television channel, this subcarrier comprising two components in quadrature with each other and separately modulated in accordance with certain functions of primary color intensities. This system is described in detail in an article by Hirsch, Bailey and Loughlin, entitled "Principles of NTSC compatible color television" in the February 1952 number of "Electronics," published by McGraw-Hill Publishing Company, New York City, and will not be described here further than to say it requires that one of the above-mentioned quadrature components be reversed in phase in successive fields of the two-fields-per-frame interlaced transmission system which the system employs.

My present invention concerns a switching circuit which may be employed to reverse the phase of the above-mentioned quadrature component. It is essential that this switching operation be performed, not only in accurate timing with the interval between successive fields, but with the quadrature component of the correct polarity or sense to correspond with the field being transmitted at any instant.

The above-mentioned phase reversal in successive fields may be effected by what amounts to a double-throw switch comprising a pair of gating tubes, one of which connects the channel carrying the properly modulated quadrature component to a demodulation channel with one polarity during the first field of a frame and the other of which connects that channel to the demodulation channel with the opposite polarity during the second field of the frame. These gating tubes are controlled by a multivibrator, the respective tubes of which are rendered alternately conducting in successive fields by impressing upon them the driving signals for the vertical scanning of the transmitter in the form of positive voltage pulses having the standard frequency of sixty per second, together with field recognition pulses occurring at each second one of said vertical scanning pulses, i. e. at a frequency of thirty per second. An arrangement of the multivibrator circuit which insures that the quadrature component switched on by each thirty-cycle pulse is of the correct sense or polarity, is a particular feature of my invention.

Other situations are met with in electronic circuit practice where multivibrator pulses in group sequence respectively initiate several events in a predetermined sequence which must be started by a control pulse having the frequency of the successive groups; for example, each control pulse may initiate a group of three, or four, etc. multivibrator pulses. My invention applies in such a situation.

One object of my invention is accordingly to provide a means for delivering currents to a utilization channel in a television system which shall reverse in phase with each successive picture-field transmitted.

Another object is to provide an arrangement for reversing the phase during successive fields of a current component furnishing color information in a color television system.

Another object is to provide an arrangement for switching an information channel synchronously with transmission of successive picture fields to supply a work channel with reversed polarities on successive fields.

Another object is to provide a multivibrator synchronized by periodic control pulses which shall operate with a predetermined sense following each pulse.

Another object is to provide a multivibrator circuit controlling gating tubes for a signal channel, which connect said channel to a utilization circuit in reversed polarity on successive signal periods in response to two sets of timing pulses, one of periodicity twice the other, said multivibrator having a constant polarity following the occurrence of each timing pulse of lower periodicity.

Another object is to provide a switching circuit which shall connect a color-information channel to a utilization circuit in a color television system with reversed polarity in successive fields by employing multivibrator pulses of constant polarity for the first field of each frame.

Still another object is to provide a switching arrangement for the color information channel of an NTSC type color television system which shall insure a predetermined sense for the color subcarrier quadrature components delivered to the utilization circuit on the first field of each frame.

Other objects of my invention will become apparent from reading the following description taken in connection with the drawings in which the single figure is a schematic diagram of the circuits of a transmitter for color television pictures in which the principles of my invention are embodied.

Referring to the drawing in detail, a television picture transmitter 1 is modulated by circuits of the type represented in Fig. 5 of the above-mentioned February 1952 "Electronics" article which, except for the circuit components shown in detail in Fig. 1 hereof, are sufficiently well known in the art to require no description here. In general, the modulation circuits comprise a signal generator 2, which may comprise the units labelled "color camera" and "monochrome signal generator" and their interconnecting circuits in said Fig. 5; and a color subcarrier network in which my invention is embodied. The color subcarrier network comprises a phase inverter 3 fed from channel 4 which causes the monochrome picture signal to the R. F. transmitter 1, a pair of signal adders 5 and 6 feeding respectively modulators 7 and 8 having outputs connected to the R. F. transmitter 1; a subcarrier oscillation generator 9; and a network for switching the tubes controlling the polarity with which one phase of the output of subcarrier oscillation generator 9 is impressed on modulators 7 and 8 which embodies the novel components of my invention and which I will now describe in detail.

As is pointed out in the above-mentioned "Electronics" article, the monochrome picture signal from signal generator 2 is phase inverted by inverter 3 and combined in adder 5 with the red picture signal, and in adder 6 with the blue picture signal. The output of adder 6 acts in modulator 8 to modulate a voltage of subcarrier frequency from generator 9 and the output of adder 5 acts in modulator 7 to modulate with the output of adder 5 a voltage which is in quadrature with that impressed from generator 9 in modulator 8. It is further required that the polarity of the quadrature voltage impressed on modulator 7 be reversed between each pair of fields of the picture.

The two quadrature voltage components of subcarrier frequency may be derived from subcarrier oscillation generator 9 in any suitable way which is symbolized here by 90° phase shift network 11 from which a voltage component in quadrature with that impressed on modulator 8 is picked off, and impressed on modulator 7. The voltage component from phase shift network 11 is transmitted through one or the other of two gating tubes in modulator 7, which are alternately rendered, the one conductive and the other non-conductive, by voltages impressed on their control electrodes by a multivibrator 15 through leads 16 and 17.

The voltages impressed by multivibrator 15 on the control electrodes of the above-mentioned gating tubes have, respectively, the wave forms 18 and 19, and both pass through zero during the intervals between fields of the picture transmission; that is, each wave has a frequency of thirty cycles per second. The multivibrator 15 is of a well known type comprising two grid-controlled tubes 21, 22 having their cathodes grounded through cathode resistors 23, 24. The anode of tube 21 is connected through a resistor 25 to the positive terminal 26 of a direct current source which has its negative terminal grounded, and also through a blocking capacitor 27 to lead 16. The anode of tube 22 is similarly connected through a resistor 28 to positive terminal 26, and through a blocking capacitor 29 to the lead 17. The control electrode of tube 21 is connected to ground through a resistor 31, and also connected through a capacitor 32 to the anode of tube 22; while the control electrode of tube 22 is connected to ground through a resistor 33 and to the anode of tube 21 through a capacitor 34. The tubes 21 and 22 will be seen to form a multivibrator capable of generating wave forms of the general form of wave forms 18 and 19, which are one hundred and eighty degrees out of phase.

To properly synchronize the multivibrator 15 so that the zero values of its waves coincide with the intervals between fields of the picture, the vertical synchronizing pulse from the picture pick-up tube of the signal generator 2 is impressed through a capacitor-resistor coupling 35, 36 on the control grid of a pulse amplifier 37, and the output voltage of the latter impressed through a blocking capacitor 38 and resistor 39 on the grid channel of multivibrator tube 22. The pulse impressed on the input of pulse amplifier 37 has the wave form 40 of conventional type and occurs in the vertical beam-return-time which intervenes between each pair of picture fields. Sixty pulses 40 thus occur per second.

The vertical sync pulses 40 are also fed to a frequency divider unit 41 which produces at its output pulses of the same general form 42 as pulses 40 but timed to coincide with every other pulse 40. The pulses 42 are impressed through a capacitor-resistor coupling 43, 44 on the control electrode of a pulse amplifier 45, the output of which is impressed through a blocking capacitor 46 and resistor 47 on the control-electrode channel of multivibrator tube 21. The pulses 42 occur between the second field of one frame and the first field of the succeeding frame.

Multivibrators of the general type of unit 15 are conventionally arranged with the capacitors 32 and 34 similar, the resistors 25 and 28 similar, and resistors 31 and 33 similar so that the multivibrator is symmetrical. In absence of such synchronizing pulses as pulses 40 and 42, the multivibrator generates waves having a frequency fixed by the time constants of the circuit elements just enumerated. Such multivibrators are conventionally synchronized with a set of pulses like 40 by giving the circuit of each tube a time constant which tends to set a frequency just a little lower than that of such synchronizing pulses. However, if the resistors and capacitors of both tube 21 and tube 22 are given time constants which would produce free-running at a frequency a little lower than the pulse 40 frequency of sixty per second, it is found that any brief interruption of the thirty-per-second pulses 42 may permit the multivibrator to lock in step with pulses 42, when they resume, with its phase reversed. In other words, while pulses 42 are intended primarily to insure that the pulses impressed by multivibrator 15 on the control electrode of one gating tube in modulator 7 shall have the phase represented by wave form 18, the multivibrator voltage so impressed may, after reappearance of pulses 42, have the phase represented by wave form 19. In short, pulses 42 will fail of their purpose if the multivibrator 15 is designed in the way usual in the art.

The above-described defect may be avoided by lengthening the time constant of the multivibrator tube 22, on the control electrode channel of which the vertical sync (sixty cycles per second) pulses are impressed, to double the conventional value. If now allowed to run free, multivibrator tube 22 will have an off time of greater than 1/30 second. If this is done, the multivibrator must fire in the proper sense immediately the 30 cycle per second pulse is regained, regardless of the phase condition before regaining this pulse. Thus both wave form 18 and wave form 19 will bear a fixed time relation to the occurrence of the thirty-per-second pulses 42, and so to the timing of the first field in each picture frame transmitted.

To give one specific example of the use of my invention, a circuit operative for conventional FCC standard television pictures may have circuit elements of the values indicated in Fig. 1, the capacitors being valued in micromicrofarads, M signifying megohms and K thousands of ohms in the case of resistors.

While I have described an arrangement in which the multivibrator produces two pulses for each occurrence of the main (30 cycle) timing pulse situations are met with, usually in fields other than television, where three, four, or a larger number of multivibrator pulses are desired to occur for each main timing pulse. My invention may be adapted to such synchronizing by making the time constant of the grid circuit on which the more frequent pulses are impressed (e. g. the 60-cycle pulses described above) just a little more than three (or four, or the larger number, as the case may be) times the value which would, if in sole control, cause the multivibrator to vibrate at said more frequent rate.

I claim as my invention:

1. In a color television system in which pictures are transmitted in separate frames each comprising two successive separate fields, a first source of picture signals modulated for one color component and a second source of picture signals modulated for another color component, a first modulator having said first source in its input and a second modulator having said second source in its input, a first source of subcarrier voltage in the input of said first modulator and a second source of subcarrier voltage in quadrature therewith in the input of said second modulator, means which connects said second source of subcarrier voltage to said second modulator with one sense on one said field and with the reverse sense on a second said field, a multivibrator connected to control said second source of subcarrier voltage by its alternations and having one side provided with a time constant adjusted for over double the periodic time between picture fields, means for impressing on said one side a sync pulse in each interval between picture fields and means for impressing on the other side of said multivibrator a sync pulse in each interval between picture frames.

2. In a color television system of the NTSC type in which pictures are transmitted in separate frames, each comprising two successive separate fields, a first source of picture signals modulated for one color component and a second source of picture signals modulated for another color component, a first modulator having said first source in its input and a second modulator having said second source in its input, a first source of subcarrier voltage in the input of said first modulator and a second source of subcarrier voltage in quadrature therewith in the input of said second modulator, means which connects said second source of subcarrier voltage to said second modulator with one sense on said first field and with the reverse sense on said second field, a multivibrator connected to control said second source of subcarrier voltage by its alternations and having one side provided with a time constant adjusted for over double the periodic time between picture fields, means for impressing on said one side a sync pulse in each interval between picture fields and means for impressing on the other side of said multivibrator a sync pulse in each interval between picture frames.

3. In combination with a multivibrator comprising a pair of units, each comprising an anode, cathode and control electrode, said cathodes being interconnected, each control electrode being connected through a resistor to its associated cathode and through a capacitor to the anode of the other unit, a first periodically recurring input signal source of one frequency, a second periodically recurring input signal source of double said one frequency, means connecting said first input signal source and the control electrode of the first said unit, said means including the capacitor connecting the control electrode of the first said unit to the anode of the other unit, and means connecting said second input signal source and the control electrode of the other said unit, said means including the capacitor connecting the control electrode of the other said unit to the anode of the first said unit, with the time constant of the capacitor and resistor connected to the control electrode of the other said unit being proportioned for a periodic discharge frequency substantially greater than double said one frequency.

4. In combination with a multivibrator comprising a pair of units, each comprising an anode, cathode and control electrode, said cathodes being interconnected, each control electrode being connected through a resistor to its associated cathode and through a capacitor to the anode of the other unit, a first periodically recurring input signal source of one frequency, a second periodically recurring input signal source of double said one frequency, means connecting said first input signal source and the control electrode of the first said unit, said means including the capacitor connecting the control electrode of the first said unit to the anode of the other unit, and means connecting said second input signal source and the control electrode of the other said unit, said means including the capacitor connecting the control electrode of the other said unit to the anode of the first said unit, with the time constant of the capacitor and resistor connected to the control electrode of the other said unit being proportioned for a periodic discharge frequency substantially greater than said one frequency.

5. In combination with a multivibrator comprising a pair of units, each comprising an anode, cathode and control electrode, said cathodes being interconnected, each control electrode being connected through a resistor to its associated cathode and through a capacitor to the anode of the other unit, a first periodically recurring input signal source of one frequency, a second periodically recurring input signal source of double said one frequency, means connecting said first input signal source and the control electrode of the first said unit, said means including the capacitor connecting the control electrode of the first said unit to the anode of the other unit, and means connecting said second input signal source and the control electrode of the other said unit, said means including the capacitor connecting the control electrode of the other said unit to the anode of the first said unit, with the time constant of the capacitor and resistor connected to the control electrode of the other said unit being about twice that of the capacitor and resistor connected to the other said control electrode.

6. In combination with a multivibrator comprising a pair of units, each comprising an anode, cathode and control electrode, said cathodes being interconnected, each control electrode being connected through a resistor to its associated cathode and through a capacitor to the anode of the other unit, a first periodically recurring input signal source of one frequency, a second periodically recurring input signal source of $n$ times said one frequency, means connecting said first input signal source and the control electrode of the first said unit, said means including the capacitor connecting the control electrode of the first said unit to the anode of the other unit, and means connecting said second input signal source and the control electrode of the other said unit, said means including the capacitor connecting the control electrode of the other said unit to the anode of the first said unit, with the time constant of the capacitor and resistor connected to the control electrode of the other said unit being proportioned for a periodic discharge frequency substantially greater than $n$ times said one frequency, $n$ being an integer.

7. In combination with a multivibrator comprising a pair of units, each comprising an anode, cathode and control electrode, said cathodes being interconnected, each control electrode being connected through a resistor to its associated cathode and through a capacitor to the anode of the other unit, a first periodically recurring input signal source of one frequency, a second periodically recurring input signal source of $n$ times said one frequency, means connecting said first input signal source and the control electrode of the first said unit, said means including the capacitor connecting the control electrode of the first said unit to the anode of the other unit, and means connecting said second input signal source and the control electrode of the other said unit, said means including the capacitor connecting the control electrode of the other said unit to the anode of the first said unit, with the time constant of the capacitor and resistor connected to the control electrode of the other said unit being about $n$ times that of the capacitor and resistor connected to the other said control electrode, $n$ being an integer greater than one.

References Cited in the file of this patent

UNITED STATES PATENTS

| | | |
|---|---|---|
| 1,936,789 | Harmon | Nov. 28, 1933 |
| 2,248,975 | Faudell | July 15, 1941 |
| 2,338,395 | Bartelink | Jan. 4, 1944 |
| 2,514,023 | Bergfors | July 4, 1950 |
| 2,517,550 | Earp | Aug. 8, 1950 |
| 2,552,303 | Anderson | May 8, 1951 |

OTHER REFERENCES

Principles of NTSC Color Television, pages 88–97 inclusive, Electronics, February 1952.